A. L. PASCHALL.
BALL BEARING AXLE.
APPLICATION FILED NOV. 29, 1912.
1,105,451.
Patented July 28, 1914.
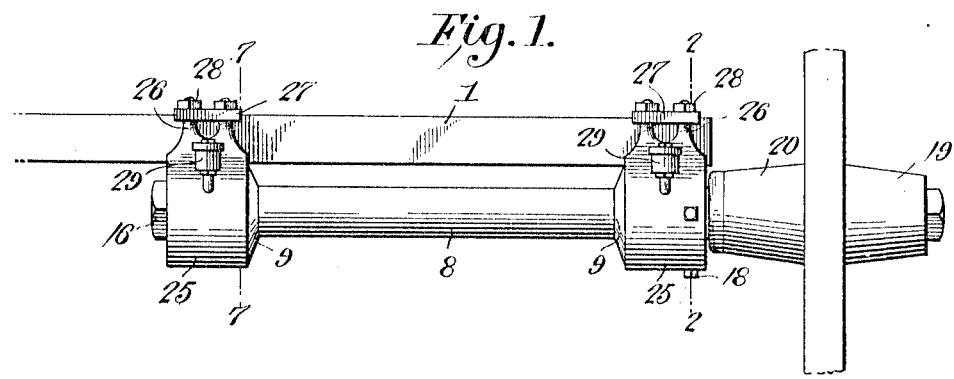
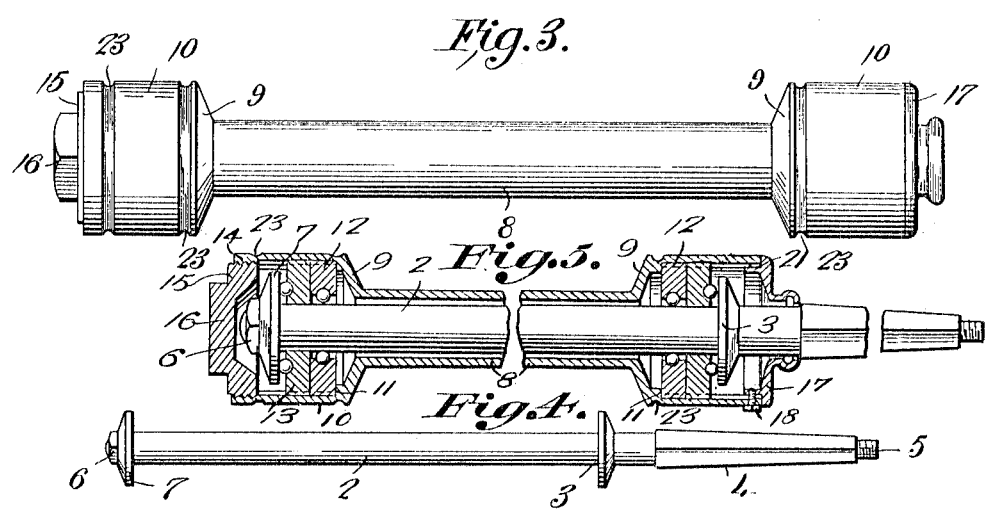
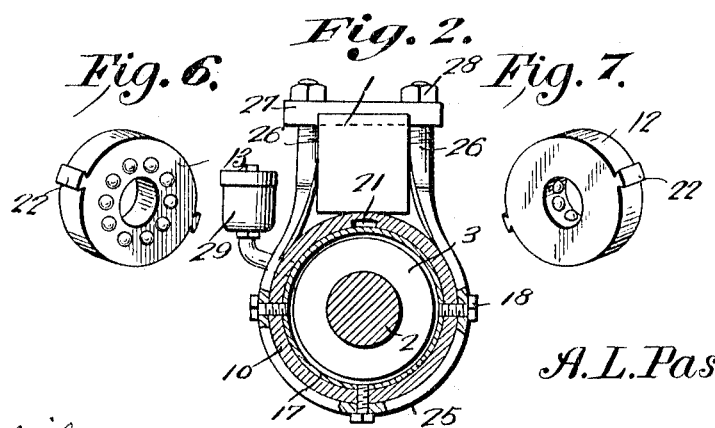
Inventor
A. L. Paschall,
Witnesses
Carroll Bailey.
R. M. Smith.
By Victor J. Evans
Attorney
THE NORRIS PETERS CO., PHOTO-LITHO., WASHINGTON, D. C.

UNITED STATES PATENT OFFICE.

ARTHUR LEE PASCHALL, OF OLAA, TERRITORY OF HAWAII.

BALL-BEARING AXLE.

1,105,451.     Specification of Letters Patent.     Patented July 28, 1914.

Application filed November 29, 1912. Serial No. 734,121.

*To all whom it may concern:*

Be it known that I, ARTHUR L. PASCHALL, a citizen of the United States, residing at Olaa, in the county of Hawaii and Territory of Hawaii, have invented new and useful Improvements in Ball-Bearing Axles, of which the following is a specification.

This invention relates to ball bearing axles for vehicles of various types, such as buggies, surreys, carts, light wagons, and the like, the axle reducing friction to a minimum and providing a light running gear for such vehicle, also avoiding the necessity of taking up the constant wear, to which ordinary axle spindles are now subjected, and doing away with the use of washers, bushings and the like. The invention also does away with the necessity of frequently removing the wheels for oiling or greasing, and besides being neat and substantial, the parts may be easily and quickly disassembled or replaced and renewed, as may be found necessary.

With the above and other objects in view, the invention consists in the construction, combination and arrangement of parts, as will be hereinafter more fully described, illustrated in the accompanying drawings, and pointed out in the claim hereunto appended.

In the drawings: Figure 1 is a view in elevation, showing the invention applied to an ordinary vehicle axle. Fig. 2 is a cross section taken on the line 2—2 of Fig. 1. Fig. 3 is a side elevation of the spindle casing detached. Fig. 4 is a similar view of the spindle detached. Fig. 5 is a longitudinal section through the spindle and its casing, showing the arrangement of ball bearings. Fig. 6 is a detail view of one of the end thrust ball bearings. Fig. 7 is a similar view of the radial ball bearing.

Referring to the drawings, 1 designates an ordinary vehicle axle, to which the present invention is shown applied.

The device contemplated in this invention embodies a rotary spindle 2 having at the wheel end thereof a fixed collar 3, while the wheel bearing portion thereof is preferably squared, and also made tapering, as shown at 4, to have the vehicle wheel made fast thereon, so as to rotate therewith, the extremity of the spindle being reduced and threaded, as shown at 5, to receive the usual retaining cap nut. At its inner end the spindle 2 is reduced and threaded to receive a nut 6, behind which is arranged a removable collar 7, preferably corresponding in size with the fixed collar 3. 8 designates a tubular casing for said spindle, said casing having its opposite ends considerably enlarged, as shown at 9, to form cylindrical housings 10 for the ball bearing elements. Each of the housings or enlarged end portions of the casing is provided with a shoulder 11, against which is seated a radial ball bearing 12, while against the outer side of the radial ball bearing 12 is an end thrust ball bearing 13, against which the collar 7 or 3 bears, as the case may be. This provides both for the radial and end thrust of the spindle in the casing 8, in which it is completely housed.

At its inner end the enlarged portion 10 of the casing is internally threaded, as shown at 14, to receive a removable threaded plug 15 having a squared boss 16, so that a wrench may be applied thereto for securing and removing the plug. At the opposite end, the casing is fitted with a removable collar or cap 17 which fits into the end of the casing, and is held in place by means of any desired number of fasteners 18, shown in the form of screws or bolts.

In order to prevent the admission of dirt, dust, and other foreign matter, the wheel hub, indicated at 19, is also provided with a flanged collar 20 at its inner end, which fits over and embraces the collar 17, the overlapping arrangement of the two collars 17 and 20 serving to effectively exclude foreign matter and keep the bearings clean and in good working condition.

The outer enlarged end of the casing is provided with longitudinally extending grooves 21 arranged at diametrically opposite points and made of dove-tail shape in cross section, so as to receive corresponding dove-tailed projections 22 on the radial and end thrust bearings 12 and 13, thereby preventing the rotation of said bearings within the casing, and giving the full effect thereto.

In order to secure the casing 8 to the axle 1, the enlarged end portions thereof are exteriorly provided with annular grooves 23 which are adapted to receive internal ribs or tongues 24 on clips 25 which embrace such enlarged portions of the casing, and also partially embrace the axle 1, each of said clips being provided with threaded shanks 26 which pass through a washer plate 27 and receive nuts 28, in a manner similar to the ordinary axle clips now in common use. It will be observed that by reason of the construction just described, the spindle and casing are securely fastened to the axle and held against any relative movement, so that the casing and spindle in effect become an extension of the axle 1. The wheel being fast on the spindle causes said spindle to rotate within the casing 8, the spindle being supported by the bearings 12 and 13 which act both in a radial and longitudinal direction with respect to the rotation of the axle.

The device hereinabove described forms a very light, substantial and attractive attachment for the ordinary vehicle axle, enables an ordinary vehicle to be converted into a ball bearing conveyance, greatly reducing the friction and increasing the life and durability, as well as smooth riding qualities of the vehicle as a whole.

Oil or other lubricating material may be fed to the bearings through oil or grease cups 29 which discharge into the enlarged end portions of the casing 8, so as to feed the lubricating material directly to the bearings.

What is claimed is:

A spindle bearing attachment for non-rotating vehicle axles, embodying a tubular spindle casing having the opposite end portions thereof enlarged forming hollow cylindrical bearing containers, axle clips embracing such enlarged portions of the casing, a rotary wheel carrying spindle one end portion of which is inclosed by said casing and the other end portion of which is squared and projects beyond said casing, a radial bearing for said spindle within each enlarged portion of the casing, and an end thrust bearing for said spindle in each enlarged portion of said casing.

In testimony whereof I affix my signature in presence of two witnesses.

ARTHUR LEE PASCHALL.

Witnesses:
CARL H. G. BRAUN,
JAS. M. SMYTHE.

---

Copies of this patent may be obtained for five cents each, by addressing the "Commissioner of Patents, Washington, D. C."